May 30, 1967 P. R. BELL ET AL 3,322,954
AVERAGING LIGHT SENSOR AND RECORDING SYSTEM USING DOUBLE
PHOTOCELL STRUCTURE
Filed April 16, 1965 4 Sheets-Sheet 1

INVENTORS.
Persa R. Bell
Cecil C. Harris
BY
ATTORNEY.

INVENTORS.
Persa R. Bell
Cecil C. Harris
ATTORNEY.

INVENTORS.
Persa R. Bell
BY Cecil C. Harris

ATTORNEY.

INVENTORS.
Persa R. Bell
BY   Cecil C. Harris

ATTORNEY.

United States Patent Office 3,322,954
Patented May 30, 1967

3,322,954
AVERAGING LIGHT SENSOR AND RECORDING SYSTEM USING DOUBLE PHOTOCELL STRUCTURE
Persa R. Bell and Cecil C. Harris, Oak Ridge, Tenn., assignors to the United States of America as represented by the United States Atomic Energy Commission
Filed Apr. 16, 1965, Ser. No. 448,897
16 Claims. (Cl. 250—209)

This invention relates to an improved system for quantitatively analyzing chromatagrams, electrophoresis records, and many photographic images such as radiographic records, scintillation camera records, and particularly photographic images depicting the distribution of radioactive substances in structures such as body organs. The invention will be specifically illustrated for the last of these applications.

A typical system for the scan of body tissue for radioactive retention using a focusing collimator detector and spectrometry is set forth in U.S. Patent No. 2,942,109, issued June 21, 1960, to P. R. Bell et al. This system can then be used to provide an original chart record of radioactive deposits in body organs. Normally the chart or scan record of the scanning system is analyzed by eye. Areas of the scan vary as to the number of indications which are, in turn, dependent upon the radiation detected. The information is, however, statistically variable and a careful integration must be performed. Areas of significant contrast can generally be noted, but the exact contour or extent of distribution of radioactive material is difficult for the human eye to perceive. This is due to the fact that the area over which the eye integrates information tends to remain fixed and is a function of the recording method.

In order to provide a better analysis of the original scan record, this record may be rescanned by a suitable detector and amplifier circuit to provide a second chart or rescan record, and this reanalysis may be performed as often as desired, without subjecting the patient to any additional radiation or discomfort. The rescanning often reveals information not at first evident in original scan records, and is used effectively in determining the statistical significance of small variations in a scan record. Such a rescanning system is set forth in a paper published in the Proceedings of the Second Annual Meeting, Southeastern Chapter, Society of Nuclear Medicine, Atlanta, Georgia, March 10–11, 1961, and in AEC Report TID-7673, 1963, pp. 81–104.

The rescanner, as described in the above paper and report, is, in effect, a specialized recording densitometer. Light is passed through, or reflected from, the scan record and an apertured sensor is moved over the record to measure the light transmission or reflection as a function of position. The resultant signal is then normally converted into another image for visual analysis. A threshold may be injected to provide the desired contrast in the rescan record so as to aid the analysis. The linearity and the magnitude of the operating range may be controlled, providing various relationships between density ranges of original and rescan records. Often several rescans at different thresholds or cut-off levels must be made to give suitable results.

In order to overcome the necessity of several rescans, it is a primary object of the present invention to provide an improved rescan system for scanning original scan records of radioactive deposits in body tissue or other scan records wherein only one rescan is usually necessary to provide an adequate record for analysis.

It is another object of the present invention to provide a rescan system as in the preceding object wherein the system can be operated in different modes of operation to provide a variety of information.

These and other objects and advantages of the present invention will become apparent upon a consideration of the following detailed specification and the accompanying drawings, wherein.

Figure 1:
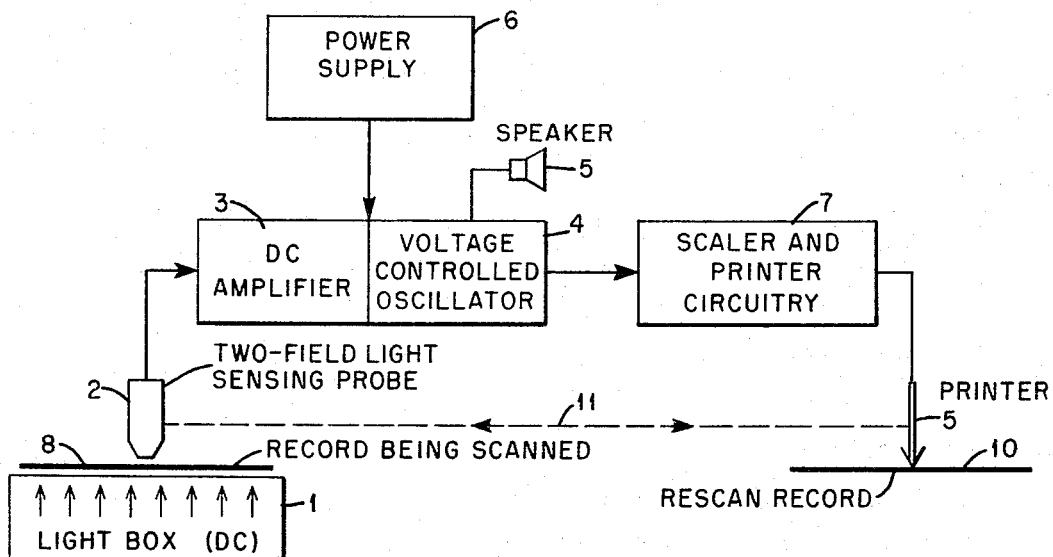
FIG. 1 is a block diagram of a rescan system to accomplish the above objects.

The above objects have been accomplished in the present invention by providing a two-field light sensor having an auxiliary sensing region and a main sensing region. The main sensing region is a small area viewed by the central aperture of the sensor and the auxliary sensing region is an annular area viewed by an annular aperture of the sensor surrounding the central aperture. The two-field light sensor is used to scan an original scan record and the output of the sensor is a pulse rate proportional to the opacity or transmission, or reflectivity, of this record with the output being used to make a new or "rescan" record. The information reaching the outer sensor area is used to adjust the threshold for the inner one. Under this mode of operation, the rescan registers the degree of contrast between the small area viewed by the central aperture and the average density of the area viewed by the surrounding aperture, whatever this density may be. Thus, the outer region automatically tends to set the threshold for the inner sensor. If the outputs of the two regions are subtracted, it is called the "inhibit" mode of operation, and, with them added, it is the "enhancing" mode of operation. If the outputs of the two regions are multiplied, it is the "cross-correlation" mode.

In original scan records of large dynamic range, it is often impossible to see, on rescans made of these records with prior rescan systems with a single threshold setting, all the targets of interest and rescans at several cut-off levels were required to provide satisfactory results. However, when using the rescanning system with the two-field sensor of the present invention, a single rescan at a single threshold setting of an original scan record with a large dynamic range is all that is necessary to provide an adequate rescan record, and all targets of interest can be easily seen on such a single rescan.

Reference is now made to the drawings. In the block diagram of FIG. 1, which shows one method of using the two-field sensor, a light box 1 directs light upwardly through the top of the box for transmission through an original scan record 8. A two-field light sensing probe 2, the details of which are shown in FIG. 2, is positioned over the scan record 8 to receive variable amounts of light transmitted through the record 8 as the probe 2 is moved over the face of the scan record in a scanning operation, with the amount of light received by the probe 2 being a function of the pattern displayed on the record 8. The outputs from the probe 2 are connected to a D.C. amplifier 2 and a voltage-controlled oscillator (VCO) 4. A power supply 6 is connected to the units 3 and 4, and a speaker 5 is connected to the output of the VCO 4. The output of the unit 4 is also connected to a scaler and printer control unit 7, and the output of the unit 7 is connected to a printer 9 for printing a rescan record on the chart member 10. The probe 2 and the printer 9 are mechanically coupled together by means of a coupling 11 such that all movements of the probe 2 are duplicated by the printer 9, in any desired size proportionality. Alternatively, if desired, instead of directing light through the scan record 8 of FIG. 1, the light source 1 may be eliminated and a light source placed above the record 8 and directed toward the record such that light is reflected therefrom and the amount of light received by the two-field sensor 2 being a function of its position with respect to the record 8.

Figure 2:
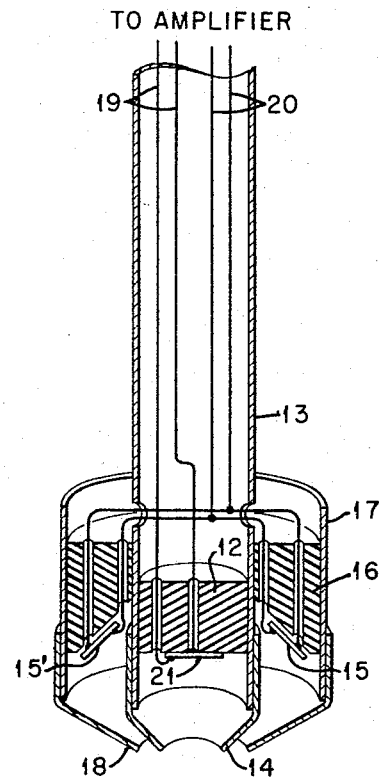
FIG. 2 is a cross-sectional drawing of an improved averaging light sensor used in the system of FIG. 1.

The details of the two-field sensor 2 of FIG. 1 are shown in FIG. 2. The sensor comprises a central photosensitive detector 21, such as a silicon diode, mounted on an insulator 12, with a shield 13 surrounding the same and terminating in a central aperture cone 14; and a plurality of similar photosensitive detectors 15, 15', connected in parallel, mounted on an insulating ring 16 positioned within a shield tube 17 which terminates in an outer aperture cone 18. It should be noted that if a properly shaped detector is used for the outer sensing area, only one photosensitive detector 15 would be required. The interior surfaces of the cones 14 and 18 and shield tubes 13 and 17 are highly reflective. The output of detector 21 is connected over leads 19 and the outputs of detectors 15, 15' are connected over leads 20 to the D.C. amplifier of FIG. 3 to be described below. It should be noted that more than two detectors may be used for the outer sensing area if necessary or desired, and the use of silicon diodes as the detectors for both sensing areas is by way of example only, it being understood that many other types of photosensitive detectors can be substituted therefor, if desired.

Figure 3:
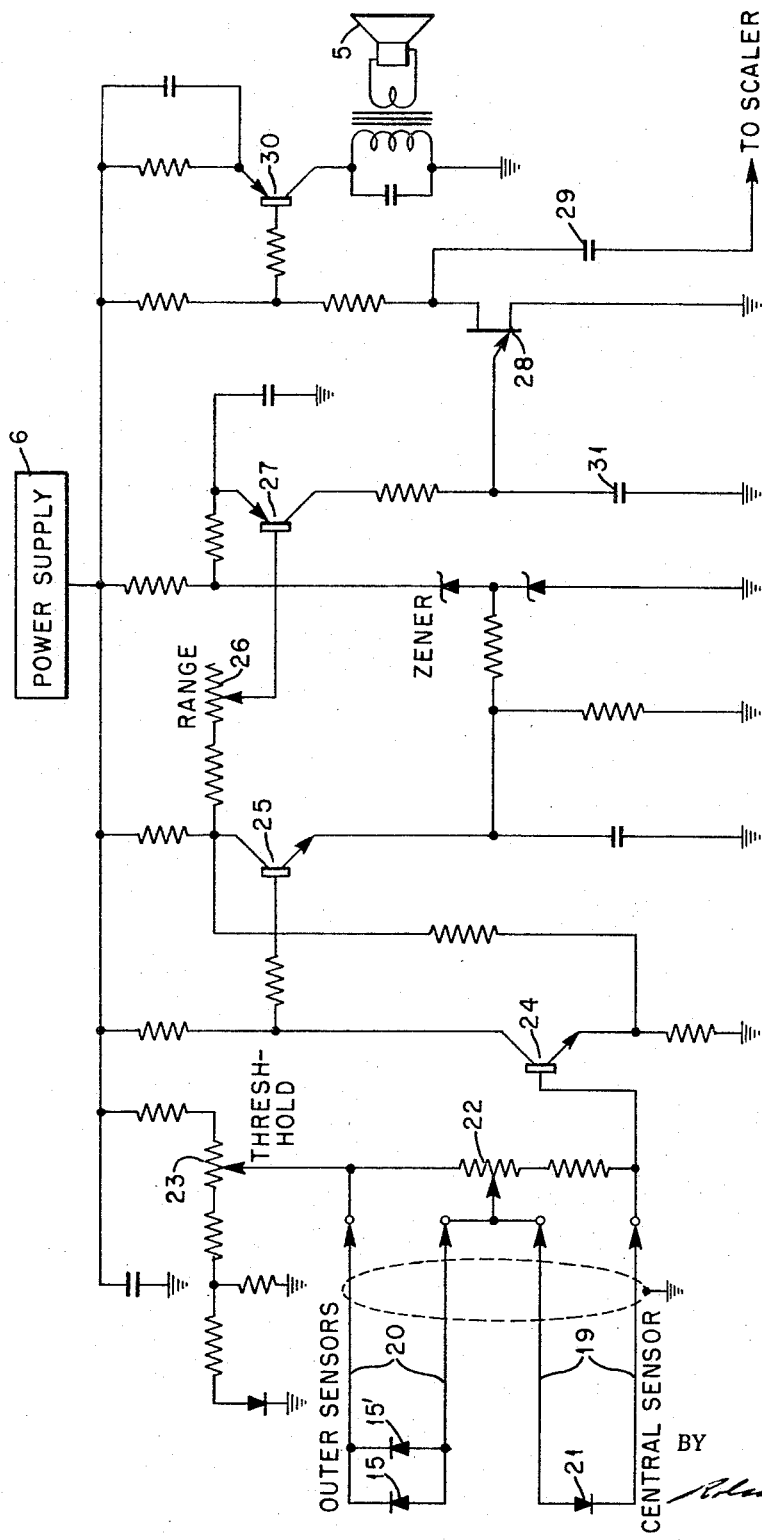
FIG. 3 is a typical schematic wiring diagram of a circuit for use with the sensor of FIG. 2.

The circuit details of the units 3 and 4 of FIG. 1 are shown in FIG. 3. The outputs of the detector 21 and detectors 15, 15' are connected in a bridge arrangement with a potentiometer 22 by means of the leads 19 and 20. The potentiometer 22 is used as a mode control. At one end of the range of this control the signal from the outer detectors is suppressed and "normal" rescanner operation results. At the other end, the inhibiting effect of the outer detectors is maximum. For most primary scan records, the best operation occurs about midscale of the mode control.

A potentiometer 23 is used as a threshold control and is used to determine how much the voltage output of the detectors must be changed to affect the collector current of the first transistor 24 of the D.C. amplifier network. The threshold or "zero" level provided by the potentiometer 23 is used as a background cut-off, and is used to provide a selected standing bias on the input to the transistor 24. The transistor 24 is coupled to another transistor 25 of the amplifier network. A feedback circuit is provided between the transistors 24 and 25, as shown, for stabilizing the amplifier network. The threshold potentiometer 23 is connected through a resistance network and a diode to ground and this diode is used for temperature compensation for the amplifier network.

The output of the amplifier transistor 25 is connected to the base of a transistor 27 through a range control potentiometer 26. The range control 26 chooses the frequency corresponding to maximum blackness with the available range being zero to about 15,000 cycles per second. A unijunction transistor (double-base diode) 28 is coupled to the transistor 27, and the transistor 28 operates in the common relaxation-oscillator mode. The transistor 27 simply acts as a rheostat that controls the charging current in the capacitor 31 at the emitter of transistor 28. A transistor 30 coupled to the output of transistor 28 is a simple amplifier to drive a small speaker 5. The output of transistor 28 is also coupled by means of a capacitor 29 to a conventional scaler and printer circuitry connected to the printer 9 of FIG. 1.

The transistors 24 and 25 could be either PNP type or NPN type, the transistor 27 is a PNP high-beta silicon transistor, and the transistor 28 may be a 2N1671B transistor, for example. The photosensitive detectors 21, 15, 15' may be silicon solar cell diodes such as Hoffman Model No. 120C, or equivalent.

As mentioned above, the rescanner system of the present invention may be operated in at least four different modes to provide a variety of information. These include the sole use of the central detector component of the sensor and thus the system operates like the prior rescan system, if such an operation is desired; or the signals desrived from the components of the two-field averaging light sensor may be added, subtracted, or multiplied, as set forth above. As mentioned above, the information reaching the outer sensor area is used to adjust the threshold for the inner sensor area.

In the operation of FIG. 3 for "inhibiting" operation of the compound sensor, the outer sensor detectors are connected as shown in this figure, and for "enhancing" operation the connections of the outer sensor detectors are reversed. When light strikes the photosensitive detectors 21, 15, 15' of the sensor, the resultant current signals at the base of the transistor 24 are amplified and effect a voltage swing at the collector of the transistor 25, and a 22-volt swing at this collector represents full output. The variable-frequency tone to the speaker 5 and the pulse outputs to the scaler are generated by the unijunction transistor 28 operating in the common relaxation-oscillator mode. The transistor 27 acts as a rheostat to control the charging current to the capacitor 31 connected to the emitter of the transistor 28, and thus acts as a control on the oscillator frequency. Collector current flow in the transistor 27 is changed by conversion of the voltage swing at the collector of the transistor 25 into base current into the transistor 27.

As mentioned above, the threshold control 23 determines how much the voltage output of the detectors must be changed to affect the collector current in the transistor 24, the setting of the mode control potentiometer 22 determines the relative voltage contributions from the inner and outer detectors, and the range control potentiometer 26 simply sets a limit on the base current of the transistor 27 for a given voltage change at the collector of the transistor 25.

Figure 4:
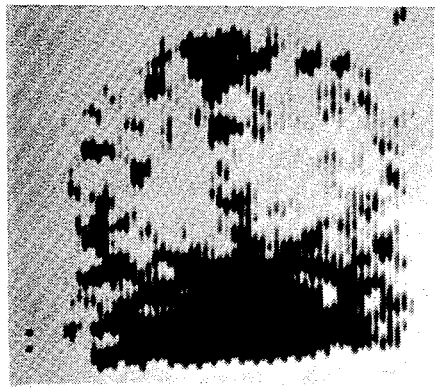
FIG. 4A shows an original brain scan record of an anteroposterior view of the head of a patient after administration of I–131 albumin.
FIG. 4B shows a simple-sensor rescan of the original scan record of FIG. 4A as made with a prior rescan system such as described in the above-cited report.
FIG. 4C shows a rescan of the original scan record of FIG. 4A using the two-field sensor and system of the present invention.
Figure 4:
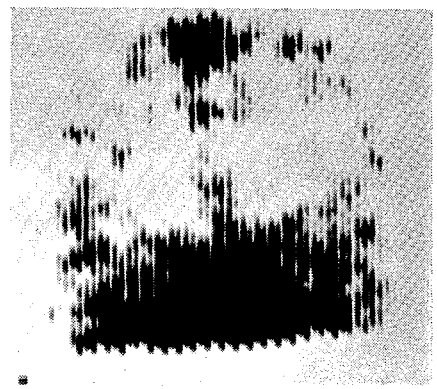
Figure 4:
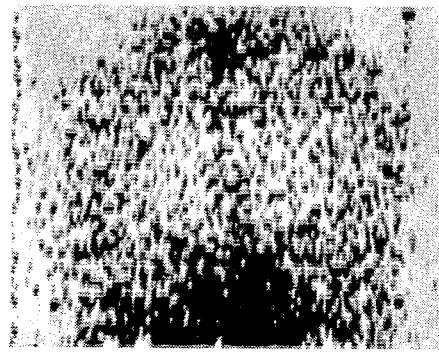

A typical result that is obtained with the sensor connected in the "inhibit" mode of operation can be seen from a comparison of FIGS. 4A, 4B, and 4C. The primary or original scan record is shown in FIG. 4A which is an antero-posterior brain scan after administration of I-131 albumin. The patient had no evidence of intracranial disease. A simple-sensor prior art rescan of FIG. 4A is shown in FIG. 4B using an aperture of 3/8 inch diameter. It should be noted that radioactivity in the middle cerebral vessels (Sylvian fissure) merges almost completely into the dark shadow of the facial activity in spite of a moderately high threshold that was used. A rescan of FIG. 4A made with the compound sensor of the present invention in the inhibit mode of operation is shown in FIG. 4C. The central aperture was the same as before, and the outer detectors were looking at a 1/8-inch-wide ring around the inner detector's viewing area. For a comparison, the appearance of the areas at the top of the cranium was made to be similar to that in the simple-sensor rescan. The emergence of detail in the facial activity in FIG. 4C should be noted.

Similarly, the inhibit mode of operation provides the privilege of running liver rescans with a single threshold setting. This is usually impossible with a simple-sensor rescan since the primary records of liver scans have a large dynamic density range and it is impossible to see, with a single threshold setting in the simple-sensor rescan, all the targets of interest.

If an area of density is large enough to cover the field of the outer detectors, the resultant strong "inhibit" signal may prevent adequate recording in a compound rescan, but may permit recording only around the edges of the dark area where the change is sudden. This effect could be useful for the demonstration of a void swamped in a sea of surounding activity with the compound rescan showing a "rim" around the void.

In the "enchancing" mode of operation, the polarity of the outer detectors is reversed in FIG. 3, so that, instead of opposing the central detector, the output current of the outer detectors is added to that of the inner detector. It is almost like using a large aperture with a single sensor, except that the contribution from the outer detectors is kept small. Thus, a contribution from the outer detectors is required for the rescanner to acknowledge a given blackness seen by the central detector. This mode of operation is useful in bringing out areas of low-level and diffuse activity in the primary scan record, without the smearing that a single, larger sensor would cause. In addition, the "enhanced" rescanner does not go out of range upon viewing a single very black mark such as an anatomical landmark on a single scan line.

Figure 5C:
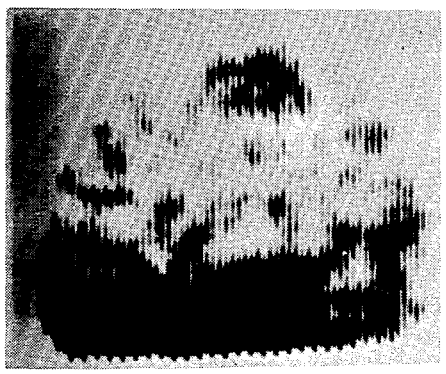
FIG. 5C shows a rescan of the original scan record of FIG. 5A using the two-field sensor and system of the present invention.
Figure 5B:
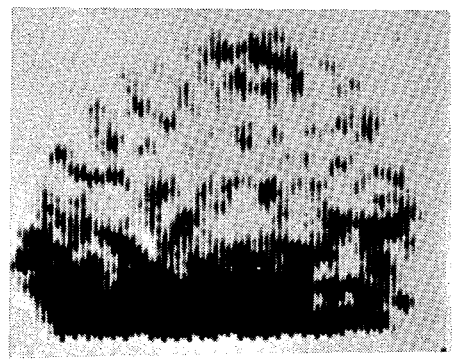
FIG. 5B shows a simple-sensor rescan of the original scan record of FIG. 5A as made with a prior rescan system such as described in the above-cited report.
Figure 5A:
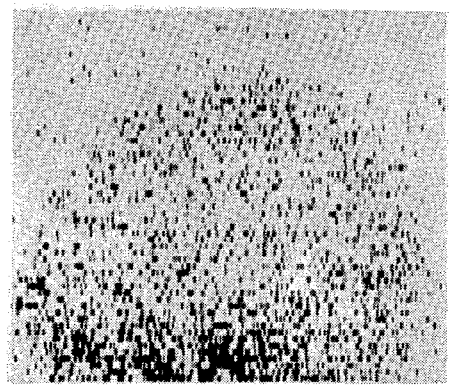
FIG. 5A shows an original brain scan record of a left lateral view of the head of a patient after administration of I–131 albumin.

A typical result that is obtained with the two-field sensor connected in the "enhancing" mode of operation can be seen from a comparison of FIGS. 5A, 5B, and 5C. The original, left lateral, brain scan is shown in FIG. 5A and it was not at all remarkable. A simple-sensor rescan of FIG. 5A, as shown in FIG. 5B, though more suggestive of abnormal activity in the parasagittal region, was not wholly convincing either. However, when an "enhancing" compound rescan was made of FIG. 5A, as shown in FIG. 5C, the result left no doubt that there was left parietal abnormality.

The two-field sensor rescan system described above has an additional application in scan record analysis. This involves cross-correlation analysis. It has been recognized that a more complete statistical analysis of the scan data might be useful in enhancing "real" data while the random "noise" would be statistically suppressed. To do this, the information on each area of a scan must be correlated with the surrounding area, and a "correlated" new record produced. This is a tedious process when done manually, thus making desirable the use of computers. However, the two-field sensor rescan system of the above-described system is adapted to perform in this manner if the output of the inner field area is multiplied in a conventional manner by the signal from the outer field area, using an appropriate selected weighting factor. Thus, cross-correlation can be accomplished in a simple manner.

From a consideration of the above-described system, it can be seen that a simple and relatively inexpensive method is provided for the rapid interpretation of information contained in the scan record of radioactivity in a patient. Also, the range of the interpretation of the information is extended by use of the above system while at the same time requiring only single rescans of original scan records for adequate results.

Since the above-described system involves the measurement of variation in light transmission or reflection, there are many applications for which it may be useful other than the reanalysis of the aforementioned scan records. For example, chromatagrams and electrophoresis records are conveniently analyzed using the above system. In addition, analyses of radiographic records, scintillation camera records, etc., are possible. Furthermore, since the particular photosensitive silicon diode detectors as used in the above system are highly sensitive to infrared radiation, this system may be used to make visible records from invisible information. Other types of analysis may be improved through use of regular photocells that are more sensitive to visible and ultraviolet radiation.

This invention has been described by way of illustration rather than by way of limitation and it should be apparent that it is equally applicable in fields other than those described.

What is claimed is:

1. A system for rescanning an original scan record of radioactive deposits in a body organ of a medical patient for determining the statistical significance of small variations in said scan record comprising a light source; a two-field light sensor positioned for receiving light from said source via said record placed therebetween; means for moving said sensor with respect to said scan record; said sensor including a central viewing field area and a first photodiode associated therewith, and an annular viewing field area surrounding said central viewing field area and at least one second photodiode associated with said surrounding viewing field area; said first photodiode providing a first output signal as a function of the amount of light received thereby, said second photodiode providing a second output signal as a function of the amount of light received thereby; first circuit means for combining said output signals in such a manner that said second output signal is utilized to automatically set the threshold for said first output signal; further circuit means connected to said first circuit means for amplifying said combined output signals to provide a rescan output signal therefrom; and means connected to said rescan output signal for recording thereof.

2. The system set forth in claim 1, wherein said first photodiode and said second photodiode are connected in such a manner that said first and second output signals therefrom are added together before being connected to said amplifier means.

3. The system set forth in claim 1, wherein said first photodiode and said second photodiode are connected in such a manner that said first and said second output signals therefrom are subtracted before being connected to said amplifier means.

4. The system set forth in claim 1, wherein said first output signal is multiplied with a selected weighting factor by said second output signal before being connected to said amplifying means to provide a cross-correlation rescan record by said recording means.

5. The system set forth in claim 1, wherein said scan record is transparent and said light source is placed beneath said transparent scan record for directing light therethrough before being received by said two-field sensor.

6. The system set forth in claim 1, wherein said scan record is reflective and said light source is directed toward the reflective surface of said record, and said two-field sensor being positioned to receive the reflective light from said record.

7. The system set forth in claim 1, wherein said surrounding viewing field area has a third photodiode associated therewith, said third photodiode being connected in parallel with said second photodiode.

8. A system for rescanning an original scan record of radioactive deposits in a body organ of a medical patient for determining the statistical significance of small variations in said scan record comprising a light source; a two-field light sensor positioned for receiving light from said source via said record placed therebetween; means for moving said sensor with respect to said scan record; said sensor including a central viewing field area and a first photodiode associated therewith, and an annular viewing field area surrounding said central viewing field area and at least one second photodiode associated with said surrounding viewing field area; said first photodiode providing a first output signal as a function of the amount of light received thereby, said second photodiode providing a second output signal as a function of the amount of light received thereby; circuit means for combining and amplifying said output signals to provide a rescan output signal therefrom; and means connected to said rescan output signal for recording thereof, said circuit means including a first, mode control potentiometer connected in a bridge circuit with the respective outputs from said photodiode and from said second photodiode, a second, threshold control potentiometer connected to one side of said bridge circuit, a two-stage amplifier network provided with a stabilizing feedback circuit, the first stage of said amplifier network being connected to the other side of said bridge circuit, means connecting the output of the second stage of said amplifier network through a transistor to a relaxtion oscillator, and means for connecting the output of said oscillator to a speaker and to said recording means.

9. The system set forth in claim 8, wherein said central viewing field area of said sensor is defined by a first tapered cone-shaped member affixed to a first tubular member with said first photodiode being insulatingly mounted within said tubular member and facing said central viewing field area toward said light source, and said annular surrounding viewing field area of said sensor is defined by a second tapered cone-shaped member encompassing said first cone-shaped member with the annular opening between said first and second cone-shaped members constituting said annular surrounding viewing field area, said second cone-shaped member being affixed to a second tubular member enclosing said first tubular member and defining a space therebetween, said second photodiode being insulatingly mounted within said space and facing toward said surrounding viewing field area.

10. The system set forth in claim 8, wherein said first photodiode and said second photodiode are connected in such a manner that said first and second output signals therefrom are added together before being connected to said amplifier network, and said first potentiometer is utilized to select the relative contribution from each of said first and second output signals to said amplifier network.

11. The system set forth in claim 8, wherein said first photodiode and said second photodiode are connected in such a manner that said first and said second output signals therefrom are subtracted before being connected to said amplifier network, and said first potentiometer is utilized to select the relative contribution from each of said first and second output signals to said amplifier network.

12. The system set forth in claim 8, wherein said first output signal is multiplied with a selected weighting factor by said second output signal before being connected to said amplifier network to provide a cross-correlation rescan record by said recording means.

13. A system for measuring the variation of light transmission through an object of varying opacity which comprises a light source; a two-field light sensor positioned for receiving light from said source through said object placed therebetween; means for moving said sensor with respect to said object; said sensor including a central viewing field and a first photosensitive detector associated therewith, and an annular viewing field surrounding said central viewing field with a second photosensitive detector associated with said annular viewing field, said first detector providing a first output signal and said second detector providing a second output signal as a function of the amount of light received thereby; first circuit means for combining said first and second output signals in such a manner that said second output signal is utilized to automatically set the threshold for said first output signal; further circuit means connected to said first circuit means for amplifying said combined first and second output signals to provide a scanning output signal therefrom; and means for receiving said scanning output signal for the recording thereof.

14. A system for measuring the variation of light reflection from an object of varying reflectivity which comprises a light source; a two-field light sensor positioned for receiving light reflected from said object; means for moving said sensor with respect to said object; said sensor including a central viewing field and a first photosensitive detector associated therewith, and an annular viewing field surrounding said central viewing field with a second photosensitive detector associated with said annular viewing field; said first detector providing a first output signal and said second detector providing a second output signal as a function of the amount of light received thereby; first circuit means for combining said first and second output signals in such a manner that said second output signal is utilized to automatically set the threshold for said first output signal; further circuit means connected to said first circuit means for amplifying said combined first and second output signals to provide a scanning output signal therefrom; and means for receiving said scanning output signal for the recording thereof.

15. The system set forth in claim 13, wherein said first detector and said second detector are connected in such a manner that said first and second output signals therefrom are added together before being connected to said amplifying means.

16. The system set forth in claim 13, wherein said first detector and said second detector are connected in such a manner that said first and second output signals therefrom are subtracted before being connected to said amplifying means.

References Cited

UNITED STATES PATENTS

| | | | |
|---|---|---|---|
| 3,011,057 | 11/1961 | Anger | 250—71.5 |
| 3,179,001 | 4/1965 | Silverman | 250—219 |

RALPH G. NILSON, *Primary Examiner.*

M. ABRAMSON, *Assistant Examiner.*